US005116020A

United States Patent [19]

Peng et al.

[11] Patent Number: 5,116,020

[45] Date of Patent: May 26, 1992

[54] DIAPHRAGMATIC ELECTROMAGNETIC VALVE WITH LEAKAGE PREVENTING CONVEX RING

[75] Inventors: Yu-Yin Peng; Jaw-Long Chen; Tien-Ho Gau, all of Hsinchu, Taiwan

[73] Assignee: Industrial Technology Research Institute, Hsinchu, Taiwan

[21] Appl. No.: 654,459

[22] Filed: Feb. 13, 1991

[51] Int. Cl.$^5$ .............................................. F16K 31/06

[52] U.S. Cl. ............................... 251/129.17; 251/332; 251/333; 137/454.5

[58] Field of Search ................... 251/129.17, 332, 333; 137/454.5

[56] References Cited

U.S. PATENT DOCUMENTS 4,455,982 6/1984 Hafner et al. .

4,582,294 4/1986 Fargo .

5,007,458 4/1991 Marcus et al. ............ 251/129.17 X

*Primary Examiner*—Arnold Rosenthal

*Attorney, Agent, or Firm*—Lowe, Price, LeBlanc & Becker

[57] ABSTRACT

An electromagnetic diaphragm-type valve has a leakage preventing convex ring and is particularly applicable to air-aided fuel injection system. The valve includes an external housing made of a magnetic-inductive material, an electromagnetic coil set installed inside the rear part of external housing, a magnetic-inductive stator fitted to the central holding site of electromagnetic coil set, and a valve stem installed in the front part of external housing. The valve stem circumference is integrated with a deflectable rubber diaphragm so as not only to enable the valve stem to move a minor distance but also to enable the valve stem to be located in a right or left position. In addition, the diaphragm isolates an air chamber from parts defining the ranges of guidance and lift of valve stem, hence the motion of valve stem is not affected by entrance of pollutants. The diaphragm is formed to seal in compressed air in the air chamber. Effective sealing is achieved because the metal end surface of the valve stem contacts the valve seat by a metal end rubber convex ring. Simultaneously, metal contact between the valve stem and the valve seat prevents serious distortion of rubber and therefore makes the electromagnetic valve highly durable.

3 Claims, 5 Drawing Sheets

DIAPHRAGMATIC ELECTROMAGNETIC VALVE WITH LEAKAGE PREVENTING CONVEX RING

BACKGROUND OF THE INVENTION

1. Field of the Invention

The present invention relates to an air injection device which is applicable to an air-aided fuel injection system, especially to an electromagnetic valve which is able to improve engine performance and lower fuel consumption and emission through the complete mixture and atomization of injected air and fuel injected by an injection nozzle.

2. Description of the Prior Art

The present invention relates to an electromagnetic valve device, of high speed and durability, which is applicable to an air-aided fuel injection system of an engine.

Known engine fuel injection systems can be classified into hydraulic injection systems and air-assisted fuel injection systems. For the air-assisted fuel injection system, the fuel injected from injection nozzle needs to be atomized by air for better combustion effect. Therefore, a complete atomization depends on coordination between the supplied air and fuel injection nozzle.

The valve needle and valve seat sealing positions of general transitional air injection electromagnetic valve need precision processing, and the cost of such a valve is too high in terms of its sealing ability. Besides, the use of air injection is proved to cause uncertainty of valve stroke and valve interruption due to the contamination of the valve needle by fluid pollutant.

The electromagnetic valve disclosed in U.S. Pat. No. 4,582,294 relates to a three-way solenoid valve, which is able to achieve a balance between pressure forces and to reduce magnetic force through the application of a three-way solenoid valve.

However, the three-way solenoid valve disclosed in said patent has the following defects, which render it unsuitable for an air-assisted system of an engine:

1. the sealing convex ring of the front part of armature is too high, so that the rubber distorts easily and is subject to fracture and plastic deformation; it fails to coordinate with the high frequency motion operation diaphragm.

2. The application of the diaphragm is in a rolling state.

3. The electromagnetic valve does not operate in a high frequency condition, because the electromagnetic valve is not applied to the engine injection system.

In addition, in U.S. Pat. No. 4,455,982, since the ascent of said invention is affected by the air injection of ball valve and because of its inferiority in sealing, it can not be used for a long time. Furthermore, ROC patent number 44235 teaches an electromagnetic valve in which, although there is a diaphragm, there is no convex ring with durable benefit of metals bumping, so that it is not a similar invention.

In view of the aforesaid defects caused by conventional air-aided fuel injection, this invention is intended to resolve the aforesaid defects and to make advanced improvements.

SUMMARY OF THE INVENTION

The object of the present invention is to provide a diaphragmatic electromagnetic valve with a preventing convex ring applicable to an air injection device of an air-assisted fuel injection system and an electromagnetic-controlled injector. According to the electromagnetic valve of this invention, it is characterized mainly in that the air flowing path is separated from the guidance portion and valve stroke defining portion of the valve stem, such that it prevents pollution from the air and the operation of valve stem will not be affected. Furthermore, the diaphragm also can be of some assistance in the positioning the valve stem. According to the electromagnetic valve of air-assisted fuel injection system of this invention, the valve stem moves in accordance with the generation of a magnetic force. The magnetic force is generated in accordance with the input of current. Furthermore, one portion of valve stem is made of rubber, and one part of rubber is a diaphragm, another part of it is used to combine it with valve seat. Before the valve stem rises, the rubber on its end is pressed tightly by a convex ring formed at the exit circumference of valve seat. Excellent sealing efficiency is then reached, hence this is another object of the present invention.

According to the electromagnetic valve of the present invention, after the magnetic force is generated, the valve stem rises and air passes from inlet to outlet; when the magnetic force is eliminated, a spring pushes back the valve stem to its original position, and the valve stem cooperates tightly together with the valve seat. At the same time, the metallic portions of valve stem and valve seat bump each other, so as to prevent large distortion of the rubber on valve stem and maintain its function, the life of the electromagnetic valve then becomes longer. This is another object of the present invention.

A more complete understanding of these and other features and advantages of the present invention can be achieved from a careful consideration of the following detailed description of certain embodiments illustrated in the accompanying drawings.

DESCRIPTION OF THE PREFERRED EMBODIMENTS

Figure 1:
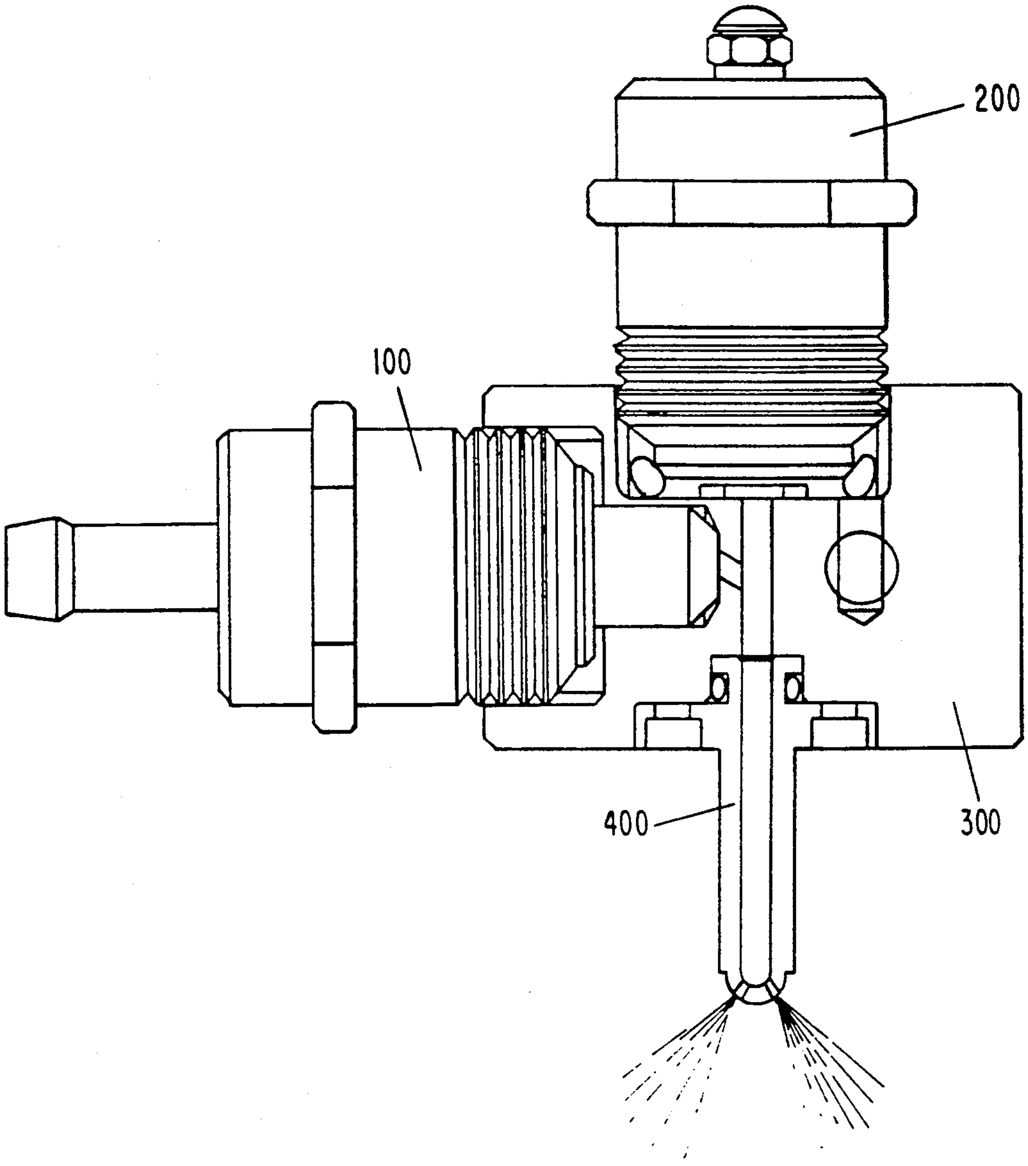
FIG. 1 is a practical example of the electromagnetic valve of the present invention in application.

Referring to FIG. 1, when the electromagnetic valve of this invention is applied to air-assisted fuel injection system, a fuel electromagnetic valve 100 and an air electromagnetic valve 200 are installed n a distributor 300. As the fuel and the air are exhausted respectively from the electromagnetic valve, they will be mixed in the flow paths of the distribution and then exhausted to cylinders of engine after being atomized in injection head 400. This invention relates to the air electromagnetic valve 200.

Figure 2:
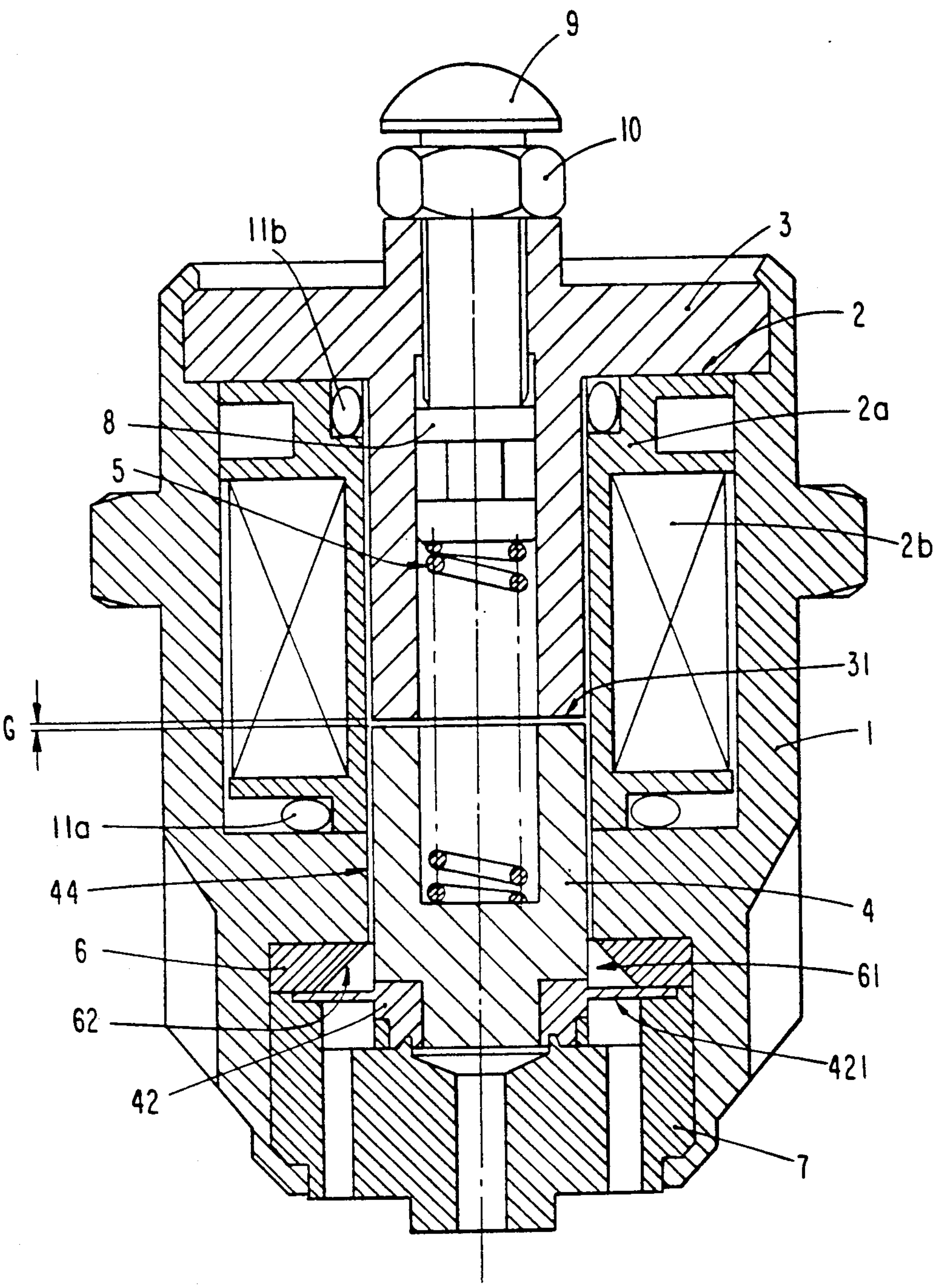
FIG. 2 is a longitudinal cross-sectional view of the electromagnetic valve of the present invention.

As shown in FIG. 2, this invention comprises mainly an external housing 1 made of high magnetic-inducted material, a coil shaft 2*a* made of plastics and an electromagnetic coil set 2 structured by the coil 2*b* wound onto the coil shaft, a magnetic stator 3 made of high magnetic-inducted material, and a valve stem 4; on the valve stem 4, there is a rubber element 42 formed as diaphragm 421 for positioning, isolation and deflective motions; above the rubber diaphragm 421, there is an valve stroke adjusting pad 6, beneath the rubber diaphragm 421 is then the valve seat 7. A helical spring 5 is installed inside the valve stem 4 and extended into the magnetic stator 3. The helical spring 5 is kept upright by a spring seat 8. An adjusting screw 9 is previously screwed through a nut 10 and then into magnetic stator 3 to press against the spring seat 8. Between the magnetic stator 3 and the electromagnetic coil set 2, and between the housing 1 and the electromagnetic coil set 2, installed respectively two oil seals 11*a*, 11*b*.

Referring again to FIG. 2, the electromagnetic coil set 2 is installed in the upper portion of the housing 1, the magnetic stator 3 then is put into the central portion of electromagnetic coil set 2, and the valve stroke adjusting pad 6, the valve stem 4 and the valve seat 7 are orderly installed in the lower portion of the housing 4, wherein, the upper half of valve stem 4 is extruded into the electromagnetic coil set 2 between the end of stator 3 and the valve stem 4, there is a gap as the valve stroke range G, this gap can be adjusted by the thickness of valve stroke adjusting pad 6 for more precision.

The lower end of valve stem 4 is integrated with the rubber diaphragm 42, and it can press tightly at the convex ring 71 of valve seat 7. A preload force between valve stem 4 and valve seat 7 can be adjusted by spring 5, when the adjusting screw 9 is spiraled to move toward the inner portion of magnetic stator 3, the spring seat 8 inside the magnetic stator 3 will be pushed, and the spring 5 will be pressed tightly, so as to enable the rubber diaphragm 42 on the valve stem 4 to make contact with convex ring 71 of valve seat 7 very closely. As a result, an excellent sealing effect can be reached only by applying small elastic force. Additionally, because the preload of spring 5 is small, the valve shall move faster if the magnetic force is the same.

Figure 5:
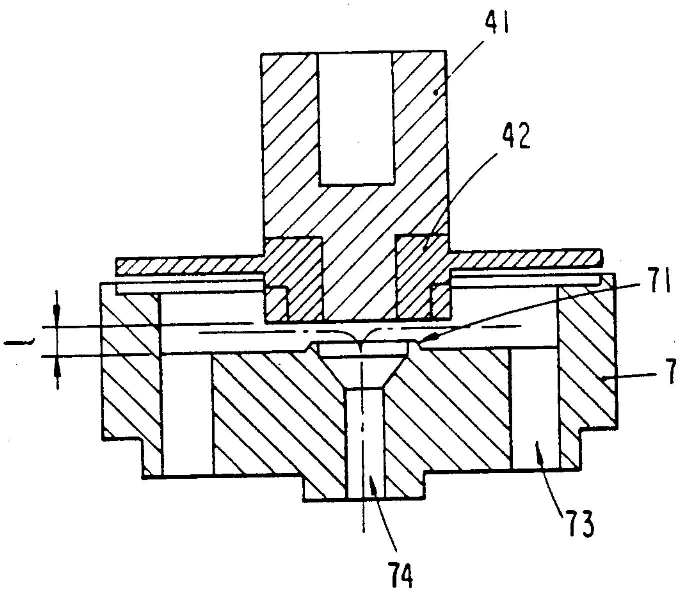
FIG. 5 is a practical example of the present invention.

The unit 10 is used for fixation of adjusting screw 9. In FIG. 2, the oil seal 11*a* is used for sealing of working fluid to prevent it from flowing through coil shaft 2*a* and exhausting out of electromagnetic valve. Because the electromagnetic coil set is surrounded by magnetic elements including the magnetic stator 3, the housing 1 and the valve stem 4, when the coils are charged with electric current, a magnetic field will be generated among the magnetic elements and a magnetic force generated between the metallic ends of magnetic stator 3 and valve stem 4 such that the magnetic stator 3 and valve stem 4 attract each other. When the magnetic force is larger than the pre-load of spring, the valve stem 4 will be lifted to a height of "X" (the lift range as shown in FIG. 5), the air flows into the valve seat 7 from the air inlet 73 and through the gap between the valve stem 4 and valve seat 7 and finally exhausts out of the valve seat from air outlet 74.

As shown in FIG. 2, the space between the central drilling hole of adjusting pad 6 and valve stem 4 enable the diaphragm 421 to attach onto the inclined plane 62 flatly, so as to prevent the diaphragm from being distorted to fracture in performing high frequency motion operations. Furthermore, when the valve stem 4 is lifted, the space 61 will offer a sufficient extension space such that when the valve stem is completely lifted, the ascent range l will be utilized.

Figure 3:
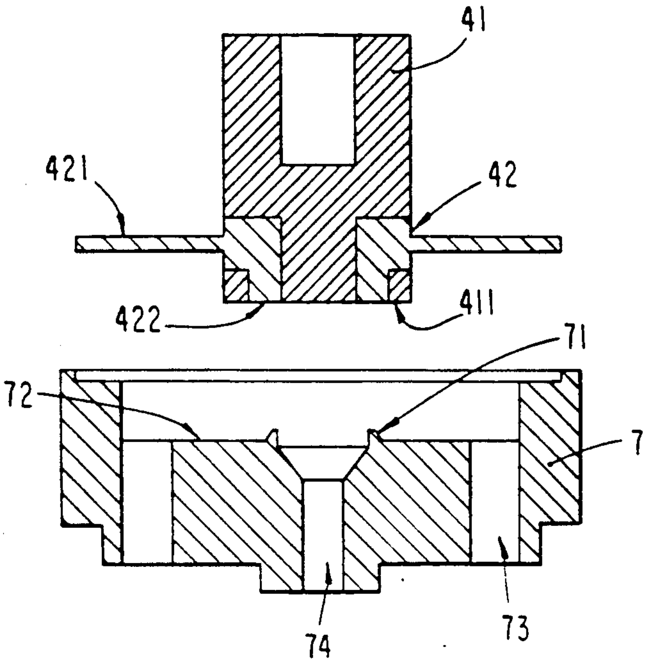
FIG. 3 is a cross-sectional view of valve stem and valve seat of the present invention.
Figure 4:
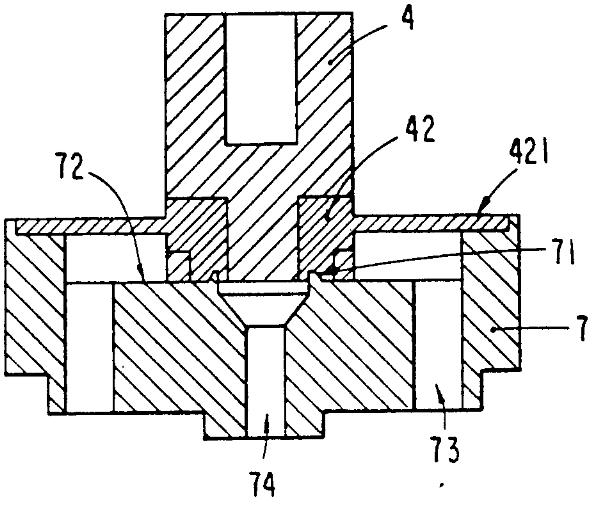
FIG. 4 is a condition of the present invention in operation.

When electric current disappears, the magnetic force also fades out at this moment, and valve stem 4 is pushed to its original position to get united with valve seat 7 the air flow is then stopped. FIG. 3 shows the condition of valve stem 4 and valve seat 7 before they get united, FIG. 4 shows the condition of valve stem 4 and valve seat 7 after they united together, wherein, the valve stem 4 made of a magnetic material 41 and a rubber element 42 attached onto it comprises an extended flat shaped diaphragm 421. As shown in FIG. 2, the diaphragm 421 is clipped between the adjusting pad 6 and valve seat 7, and it not only has the function of fixation of valve stem but also can separate the air path from the guiding portion 31 and valve stroke defining portion 44 of valve stem 4, furthermore, it performs a minor elastic movement.

As shown in FIG. 3, the rubber circular surface 422 on the front end of the rubber diaphragm 42 of valve stem 4 can be united with the metallic convex ring 71, which is formed at the circumference of air outlet at the upper end valve seat 7 with a height of approximately 0.05–0.2mm. At the same time, contact between the metallic surface 411 on the front end of valve stem 4 and the metal surface 72 on the upper end of valve seat 7 will prevent the rubber surface 422 from large distortion and consequent failure of sealing. As a result, the life of the electromagnetic valve will become longer than before.

Figure 6:
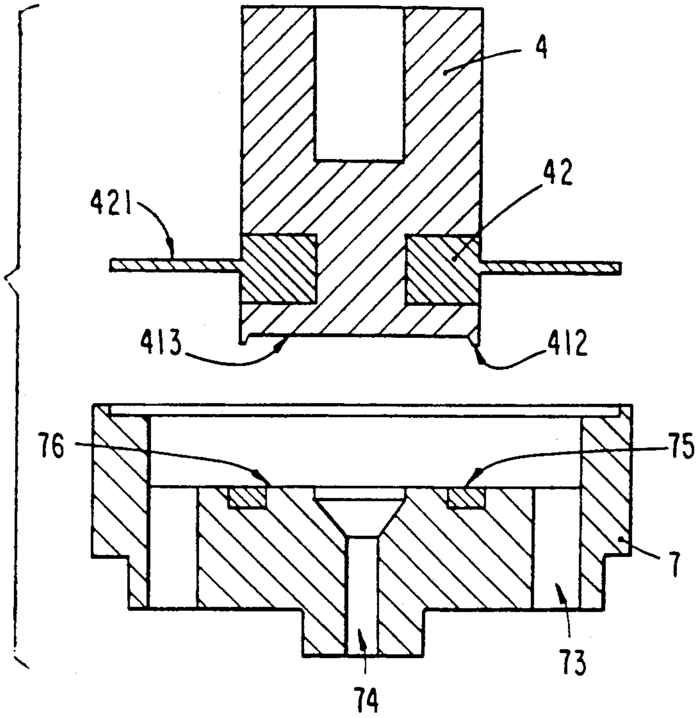
FIG. 6 is a further practical example of the present invention.

In general accordance with the above described characteristics in another embodiment as shown in FIG. 6, the metallic convex ring 412 can also be put onto the front end of valve stem 4, while a circular rubber 75 was installed onto the valve seat 7 (also can be adhered onto the valve seat), in this circumstance, when valve stem 4 moves up and down, the metallic surface 413 of valve stem 4 bumps against the metal surface 76 of valve seat 7. A large distorsion of rubber diaphragm is then prevented and the effect of sealing is maintained.

Figure 7:
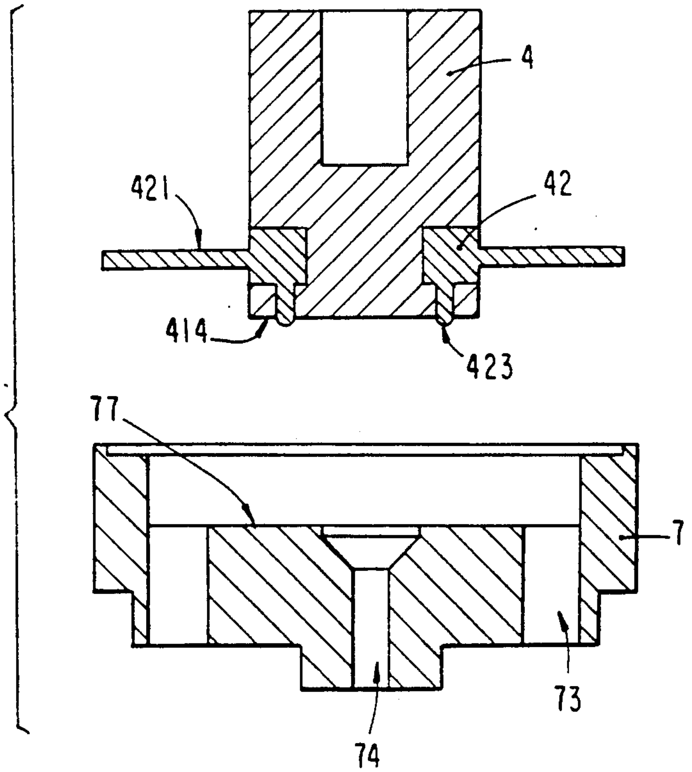
FIG. 7 is also an another practical example of the present invention.

According to the same principle, in another embodiment as shown in FIG. 7, a convex ring 423 can also be formed on the front end of rubber 42 integrated with the valve stem 4, in this circumstance, the metallic surface 414 of valve stem 4 makes contact against the metallic surface 77 of valve seat 7. As a result, the effect of complete sealing is maintained and a large distortion of rubber is prevented.

As described above, the diaphragmatic electromagnetic valve of this invention is accurately able to prevent pollutants from the air from obstructing the motion of valve stem, and increase the effectiveness of the electromagnetic valve. This eliminates the defects that make the conventional valve one not applicable in the injection system of an engine.

Although the present invention has been described with a certain degree of particularity, the present disclosure has been made by way of examples, and changes in detail of structure may be made without departing from the spirit thereof.

We claim:

1. An electromagnetic diaphragm-type valve, applicable in an air-assisted fuel injection system, comprising:

an external housing made of a material having high magnetic induction;

an electromagnetic coil having a central hole, installed in said external housing;

a magnetic stator made of a material having high magnetic induction, installed into said central hole in said electromagnetic coil set;

a movable valve stem having a metallic end installed into a rear end of the housing so as to extend into the central hole of the electromagnetic coil set to connect with the magnetic stator with a gap formed between adjacent end surfaces of the magnetic stator and the valve stem;

a valve seat disposed to support said valve stem; and at a lower end of the valve stem there is provided a circular flat rubber diaphragm with an outwardly extended substantially flat flange and a metal ring at a distal end of the rubber diaphragm, whereby an end surface of the rubber diaphragm contacts a surface of the valve seat by pressing against a convex ring formed on the valve seat for complete sealing, the height of said convex ring being in the range 0.05mm-0.20mm and, in closing of the valve, the metal ring makes contact at adjacent metallic surfaces of the valve seat.

2. An electromagnetic valve as claimed in claim 1, wherein:

said rubber diaphragm is fixed onto the lower end of valve stem, the surface of said diaphragm is at the same level as the metal end of valve stem, and a small convex ring formed on the valve seat contacts closely and tightly with the diaphragm.

3. An electromagnetic valve as claimed in claim 1, wherein:

said valve stem and valve seat contact each other at metallic surfaces other than of said convex ring, to thereby maintain durability and precision in sealing action by the valve.

* * * * *